United States Patent
Cole et al.

(10) Patent No.: US 9,445,256 B1
(45) Date of Patent: Sep. 13, 2016

(54) BINDING UPDATE FORWARDING BETWEEN PACKET GATEWAYS

(71) Applicant: Sprint Spectrum L.P., Overland Park, KS (US)

(72) Inventors: Jay D. Cole, Overland Park, KS (US); Wen Xue, Overland Park, KS (US); Talat Jamshidi, Leawood, KS (US); Rajat Kumar, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 107 days.

(21) Appl. No.: 14/520,867

(22) Filed: Oct. 22, 2014

(51) Int. Cl.
*H04W 8/02* (2009.01)
*H04L 29/12* (2006.01)
*H04W 88/16* (2009.01)

(52) U.S. Cl.
CPC ............ *H04W 8/02* (2013.01); *H04L 61/1588* (2013.01); *H04L 61/2007* (2013.01); *H04W 88/16* (2013.01)

(58) Field of Classification Search
CPC .. H04W 8/02; H04W 88/16; H04L 61/2007; H04L 61/1588
See application file for complete search history.

(56) References Cited

U.S. PATENT DOCUMENTS

| | | | |
|---|---|---|---|
| 6,230,012 B1 | 5/2001 | Willkie et al. |
| 6,697,354 B1 | 2/2004 | Borella et al. |
| 6,708,219 B1 | 3/2004 | Borella et al. |
| 6,711,159 B1 | 3/2004 | Grabelsky et al. |
| 6,731,642 B1 | 5/2004 | Borella et al. |
| 6,768,743 B1 | 7/2004 | Borella et al. |
| 6,781,982 B1 | 8/2004 | Borella et al. |
| 6,816,912 B1 | 11/2004 | Borella et al. |
| 6,956,846 B2 | 10/2005 | Lewis et al. |
| 6,973,309 B1 | 12/2005 | Rygula et al. |
| 6,993,039 B2 | 1/2006 | Borella |
| 6,996,621 B1 | 2/2006 | Borella et al. |
| 7,031,275 B1 | 4/2006 | Borella et al. |
| 7,080,151 B1 | 7/2006 | Borella et al. |
| 7,154,868 B1 | 12/2006 | Sharma et al. |
| 7,158,492 B2 | 1/2007 | Haverinen |
| 7,193,985 B1 | 3/2007 | Lewis et al. |
| 7,218,609 B2 | 5/2007 | Borella et al. |
| 7,280,546 B1 | 10/2007 | Sharma et al. |
| 7,286,512 B1 | 10/2007 | Borella |
| 7,295,511 B2 | 11/2007 | Sharma et al. |

(Continued)

OTHER PUBLICATIONS

3rd Generation Partnership Project 2 "3GPP2," Interoperability Specification (IOS) for cdma2000 Access Network Interfaces—Part 1 Overview (3G-10S v5.0.4), Mar. 2014, 28 pages.

(Continued)

*Primary Examiner* — Christopher Grey (57) ABSTRACT

A first home packet gateway (PGW) device may receive a binding update message on behalf of a wireless communication device (WCD). The first home PGW device may be associated with a first pool of Internet Protocol (IP) addresses, and the WCD may be assigned a particular IP address. It may be determined that the first pool of IP addresses does not include the particular IP address, and that the particular IP address is included in a second pool of IP addresses that is associated with a second home PGW device. Possibly in response to determining that the particular IP address is included in the second pool of IP addresses that is associated with the second home PGW device, the first home PGW device may forward the binding update message to the second home PGW device.

20 Claims, 6 Drawing Sheets

(56) References Cited

U.S. PATENT DOCUMENTS

| | | | |
|---|---|---|---|
| 7,305,429 B2 | 12/2007 | Borella | |
| 7,324,499 B1 | 1/2008 | Borella et al. | |
| 7,346,684 B2 | 3/2008 | Borella | |
| 7,366,509 B2 | 4/2008 | Akgun et al. | |
| 7,457,289 B2 | 11/2008 | Wang | |
| 7,505,432 B2 | 3/2009 | Leung et al. | |
| 7,733,904 B1 | 6/2010 | Borella et al. | |
| 7,778,220 B2 | 8/2010 | Sastry | |
| 7,813,316 B2 | 10/2010 | Sastry | |
| 8,107,496 B2 | 1/2012 | Borella et al. | |
| 8,341,295 B1 | 12/2012 | Liu et al. | |
| 8,396,076 B2 | 3/2013 | Borella et al. | |
| 8,411,858 B2 | 4/2013 | Muhanna et al. | |
| 8,422,467 B2 | 4/2013 | Wang et al. | |
| 8,437,305 B2 | 5/2013 | Cheever et al. | |
| 2002/0136226 A1* | 9/2002 | Christoffel | H04L 63/0428 370/401 |
| 2003/0208601 A1 | 11/2003 | Campbell et al. | |
| 2004/0095943 A1* | 5/2004 | Korotin | H04L 29/12009 370/401 |
| 2005/0047420 A1 | 3/2005 | Tanabe et al. | |
| 2006/0002356 A1 | 1/2006 | Barany et al. | |
| 2006/0059551 A1 | 3/2006 | Borella | |
| 2006/0104214 A1 | 5/2006 | Borella | |
| 2006/0149814 A1 | 7/2006 | Borella | |
| 2006/0159042 A1 | 7/2006 | Borella | |
| 2006/0171365 A1 | 8/2006 | Borella | |
| 2007/0171886 A1 | 7/2007 | Lewis et al. | |
| 2010/0020747 A1 | 1/2010 | Xia et al. | |
| 2011/0286410 A1* | 11/2011 | Zembutsu | H04W 36/00 370/329 |
| 2012/0084449 A1 | 4/2012 | Delos Reyes et al. | |
| 2013/0100815 A1 | 4/2013 | Kakadia et al. | |
| 2013/0322311 A1 | 12/2013 | Weniger et al. | |
| 2014/0169330 A1* | 6/2014 | Rommer | H04W 36/08 370/331 |
| 2015/0312806 A1* | 10/2015 | Perras | H04L 61/2007 370/311 |

OTHER PUBLICATIONS

3rd Generation Partnership Project 2 "3GPP2," Interoperability Specification (IOS) for cdma2000 Access Network Interfaces—Part 2 Transport (3G-IOS v5.1.4), Mar. 2014, 78 pages.

3rd Generation Partnership Project 2 "3GPP2," Interoperability Specification (IOS) for cdma2000 Access Network Interfaces—Part 3 Features (3G-IOS v5.0.4), Mar. 2014, 386 pages.

Network Working Group, "IP Mobility Support for IPv4," C. Perkins, Ed., Nokia Research Center, Aug. 2002, https://www.iett.org/rfc/rfc3344.txt, 91 pages.

ETSI TS 129 275 V11.9.0, Technical Specification, Universal Mobile Telecommunications System (UMTS); LTE; Proxy Mobile IPv6 (PMIPv6) based Mobility and Tunnelling protocols; Stage 3 (3GPP TS 29.275 version 11.9.0 Release 11), Mar. 2014, 88 pages.

3rd Generation Partnership Project 2 "3GPP2," "cdma2000 Wireless IP Network Standard: Simple IP and Mobile IP Access Services," 3GPP2 X.S0011-002-E, Version 1, Nov. 2009, 116 pages.

3rd Generation Partnership Project 2 "3GPP2," "Network PMIP Support Revision A," 3GGP2 X.S0054-220-A, Version 1.0, Aug. 29, 2008, 50 pages.

Preinterview First Office Action mailed on Oct. 26, 2015, issued in connection with U.S. Appl. No. 14/229,432, filed Mar. 28, 2014, 5 pages.

Notice of Allowance mailed on Jan. 28, 2016, issued in connection with U.S. Appl. No. 14/229,432, filed Mar. 28, 2014, 8 pages.

Xue et al., U.S. Appl. No. 14/229,432, filed Mar. 28, 2014, 42 pages.

"(LTE) Attach and Default Bearer Setup," www.eventhelix.com/lte/attach/lte-attach.pdf, Dec. 11, 2012, 6 pages.

* cited by examiner

BINDING UPDATE FORWARDING BETWEEN PACKET GATEWAYS

BACKGROUND

Wireless networks may provide packet-based services to wireless communication devices (WCDs). For example, a radio access network (RAN) may define one or more wireless coverage areas through which the WCDs may obtain wireless communication services from the RAN. A WCD may communicate with other nodes via one or more of the RAN's base stations, as well as a serving gateway (SGW) device and a packet gateway (PGW) device. In some cases, the WCD's communication sessions may be anchored at a particular PGW device (referred to as a home PGW device) such that the WCD's communications flow through the home PGW device regardless of the SGW device that is serving the WCD.

OVERVIEW

In some wireless network technologies, a WCD seeking network access may be assigned one or more Internet Protocol (IP) addresses from a home PGW device that is operated and/or controlled by the wireless service provider to which the WCD subscribes (e.g., the WCD's home wireless service provider). A bearer association between the WCD and the home PGW device may be maintained even if the WCD moves between RANs. For instance, the WCD may be assigned one or more IP addresses by the home PGW device, and may communicate using these addresses regardless of which RAN or RAN device provides wireless network access to the WCD.

When using a particular RAN, the WCD may be assigned to an SGW device. This SGW device may provide connectivity between the WCD's serving base station and the home PGW device, and may also facilitate authentication of the WCD. As the WCD moves about the coverage of a RAN, or between two or more RANs, the WCD may be handed over and/or assigned to different SGW devices.

For instance, if a WCD is served by its home network, it may be assigned an SGW device of its home wireless service provider. As the WCD moves about within the wireless coverage of the home network, the WCD may be handed over one or more times to other SGW devices of the home network. But, the WCD may maintain its bearer association with the home PGW device, and may also continue to use its assigned IP address(es).

Similarly, the WCD may roam to another wireless service provider's wireless coverage. In this case, the WCD may be handed over to and served by an SGW device of this wireless service provider. Nonetheless, the WCD may still maintain its bearer association with the home PGW device, and may also continue to use its assigned IP address(es).

Additionally, whether the WCD roams between wireless service providers or stays within the same wireless service provider's network, the WCD may be handed over between various wireless technologies. For instance, a WCD served by a "4G" Long Term Evolution (LTE) RAN might be handed over to a "3G" Code-Division Multiple Access (CDMA) RAN or a Wifi RAN. Each of these RANs may attempt to contact the WCD's home PGW in order to maintain that PGW device as the WCD's anchor point.

In any of these situations, the WCD's home network may have "statically" assigned the WCD to a particular group of home PGW devices. The WCD's serving RAN may have selected one the home PGW devices in the particular group to anchor the WCD's communication sessions, and the selected home PGW device may have allocated one or more IP addresses to the WCD. However, the identity of the selected home PGW device may not be available to other SGW devices or RANs to which the WCD is handed over. Instead, these other SGW devices or RANs may again select one of the home PGW devices from the particular group. If this selection process does not result the WCD being assigned the same home PGW device as before, the WCD's attempt to communicate using its assigned IP address may fail, and the WCD's communication sessions may also fail as a result.

One way of mitigating this situation is for a selected home PGW device to, before fully establishing a bearer association with the WCD, determine whether it is indeed the WCD's actual home PGW device. If this is the case, the selected home PGW device may establish the bearer association so that the WCD can communicate. If this is not the case, the selected home PGW device may facilitate communication between the WCD's SGW device and the actual home PGW device.

Accordingly, in an example embodiment, a first home PGW device may receive a binding update message sent on behalf of a WCD. The first home PGW device may be associated with a first pool of Internet Protocol (IP) addresses, and the WCD may be assigned a particular IP address. The binding update message may have been transmitted by an SGW device. Possibly in response to receiving the binding update message, it may be determined that the first pool of IP addresses does not include the particular IP address. Possibly in response to determining that the first pool of IP addresses does not include the particular IP address, it may further be determined that the particular IP address is included in a second pool of IP addresses that is associated with a second home PGW device. Possibly in response to determining that the particular IP address is included in the second pool of IP addresses that is associated with the second home PGW device, the binding update message may be forwarded to the second home PGW device.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. EXAMPLE WIRELESS COMMUNICATION SYSTEM

Figure 1:
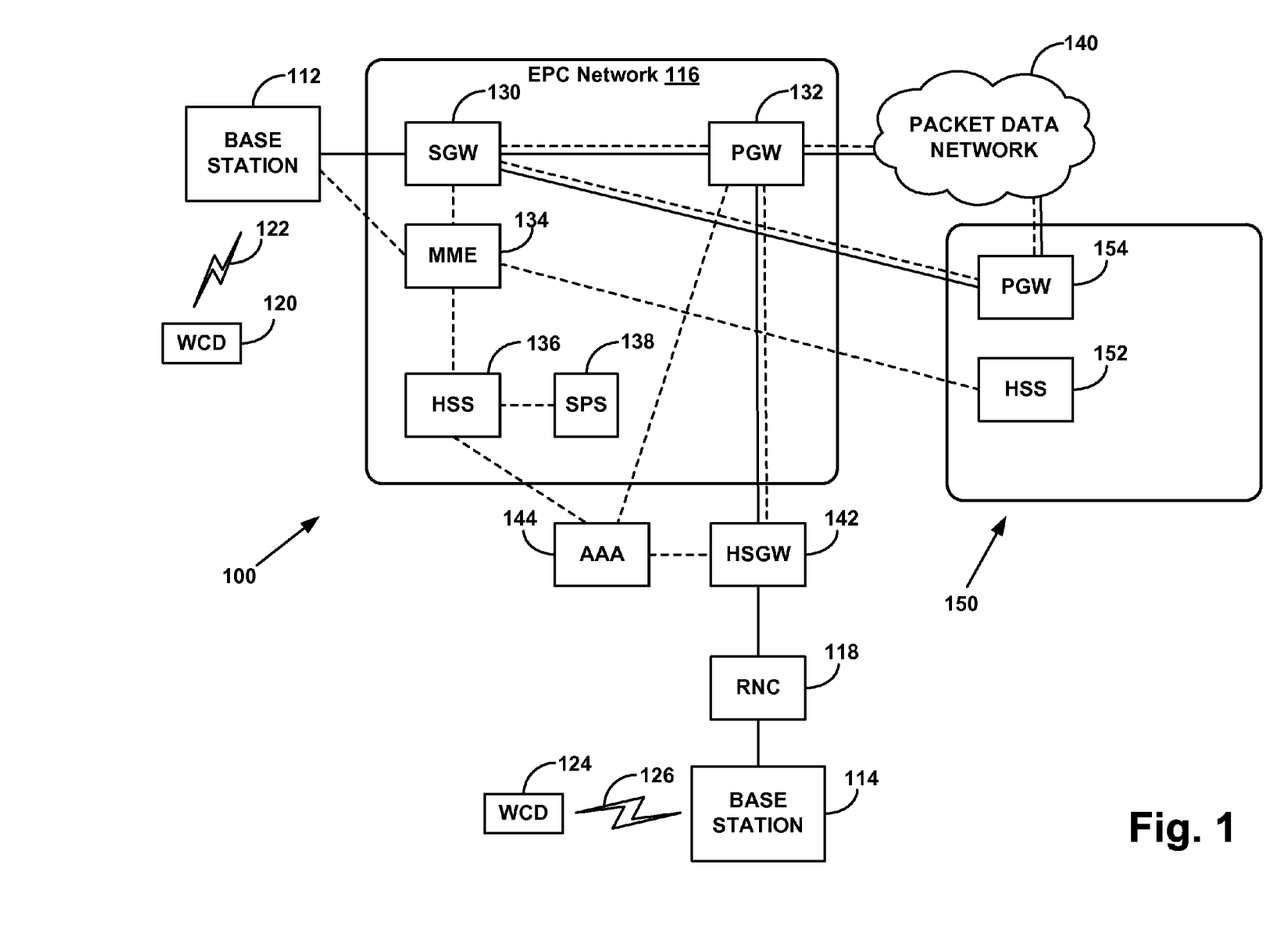
FIG. 1 is a block diagram of a wireless communication system, in accordance with example embodiments.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved radio access network (RAN) that uses an Evolved Packet Core (EPC) network 116. Base station 114 is part of a legacy RAN that includes a radio network controller (RNC) 118. Base stations 112 and 114 each provide one or more respective wireless coverage areas through which the respective base station can communicate with one or more WCDs. The wireless coverage areas provided by base stations 112 and 114 could be either overlapping or non-overlapping.

The WCDs could be wireless telephones, wirelessly-equipped handheld, tablet, or laptop computers, or any other type of WCD. Some WCDs may be referred to as user equipment (UE). Despite this nomenclature, a WCD need not be an end-user device, and may instead be one of various types of devices that have limited directed interaction with human users, such as server devices, remote telemetry devices, and/or autonomous devices.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) device 130, a packet gateway (PGW) device 132, a mobility management entity (MME) device 134, a home subscriber server (HSS) device 136, and a subscriber profile store (SPS) device 138. PGW device 132 may provide connectivity to a packet data network 140. SGW device 130 may support the exchange of Internet Protocol (IP) bearer traffic between base station 112 and PGW device 132, and/or between base station 112 and PGW device 154. MME device 134 may manage signaling traffic between base station 112 and various elements in EPC network 116, as well as signaling traffic between base station 112 and HSS device 152. This signaling traffic, for example, may be related to authentication of WCDs and activating and de-activating bearer association for WCDs. HSS device 136 may be configured to authenticate WCDs, as well as access subscriber profiles stored in SPS device 138. For example, SPS device 138 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VoIP), video, streaming media, gaming, and/or other packet data services.

For instance, a WCD subscribed to EPC network 116 may be assigned PGW device 132 for bearer traffic communication with packet data network 140. Thus, the bearer path for this WCD may include base station 112, SGW device 130, and PGW device 132. On the other hand, a WCD subscribed to network 150 may be assigned PGW device 154 for bearer traffic communication. Therefore, the bearer path for this WCD may include base station 112, SGW device 130, and PGW device 154. In some cases, in order to set up the bearer path to PGW device 154, HSS device 152 may be used to authenticate the WCD and/or to directly or indirectly assign PGW device 154 to serve the WCD.

In some embodiments, network 150, HSS device 152, and PGW device 154 may be operated by a home wireless service provider, and the other components in FIG. 1 may be operated by a roaming wireless service provider. The home and roaming wireless service providers may partner so that the roaming wireless service provider serves WCDs subscribed to the home wireless service provider when those WCDs cannot (or for some reason do not) obtain wireless coverage from the home wireless service provider. The signaling and/or data traffic exchanged between the home and roaming wireless service providers may traverse packet data network 140 and/or one or more other networks or private peering gateways. Alternatively or additionally, WCD 120 may access network 150 through an EPC network operated by the home wireless service provider.

In addition, EPC network 116 may provide packet data connections for WCDs served by other RANs, such as WCDs served by legacy RANs. Despite being served by these RANs, the WCDs may be subscribed to the roaming wireless service provider or the home wireless service provider.

In the example shown in FIG. 1, wireless communication system 100 includes an HRPD serving gateway (HSGW) device 142 that supports interworking with a legacy RAN, exemplified in FIG. 1 by base station 114 and RNC device 118, and authentication, authorization, and accounting (AAA) device 144. This interworking may involve (i) HSGW device 142 communicating with AAA device 144, which, in turn, may communicate with HSS device 136, and (ii) HSGW device 142 communicating with PGW device 132.

For example, WCD 124, when served by base station 114, may transmit a data-connection request that relates to establishing a packet data connection. HSGW device 142 may receive the data-connection request via base station 114 and RNC device 118, and, in response, communicate with AAA device 144 to authenticate WCD 124. As part of the authentication process, AAA device 144 may perform various functions, such as communicating with HSS device 136, issuing an authentication challenge to WCD 124, evaluating a response (from WCD 124) to the authentication challenge, and indicating to HSGW device 142 whether the authentication process is successful or unsuccessful. If the authentication process is successful, HSGW device 142 may communicate with PGW device 132 to request a packet data connection to packet data network 140 for WCD 124. In response to the request from HSGW device 142, PGW device 132 may communicate with AAA device 144 to authenticate WCD 124 in another authentication process. If that authentication process is successful, PGW device 132 may establish the packet data connection, which then enables WCD 124 to communicate with packet data network 140 via air interface 126, base station 114, RNC device 118, HSGW device 142, and PGW device 132. Alternatively, a similar process may be used so that WCD 124 may communicates via air interface 126, base station 114, RNC device 118, HSGW device 142, and PGW device 152.

In general, the depictions of FIG. 1 are illustrative. Therefore, in a RAN or a home network, there could be more or fewer of each element than is shown, and some elements may be omitted altogether. Additionally, other types of elements not shown may be present. Further, any of these elements or devices may be combined with one another, physically or logically, or distributed across multiple physical devices. Thus, the particular arrangement shown in FIG. 1 should not be viewed as limiting with respect to the present invention.

Consequently, this arrangement and the processes described herein are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance. Nonetheless, "devices" are physical, tangible computer hardware configured to carry out the operations associated with one or more of the components described herein.

2. EXAMPLE COMPUTING DEVICE

Figure 2:
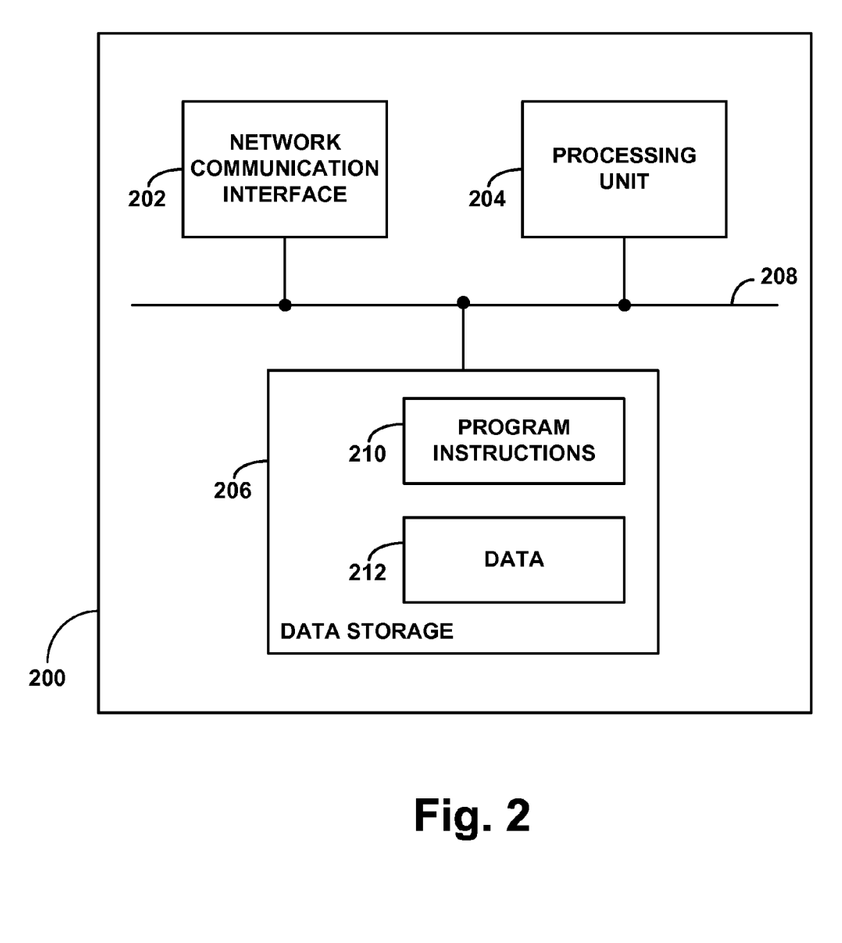
FIG. 2 is a block diagram of a computing device, in accordance with example embodiments.

FIG. 2 is a block diagram of an example computing device 200. Computing device 200 could be a standalone general purpose or specialized computing device. Alternatively, computing device 200 could be a WCD or a part of the RAN. Thus, computing device 200 may represent a base station, MME device, SGW device, PGW device, HSS device, or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various operations described herein and/or depicted in the accompanying drawings. Data 212 could be any data that is generated, received, stored, or used in connection with carrying out such operations.

3. EXAMPLE MESSAGE FLOWS

Figure 3:
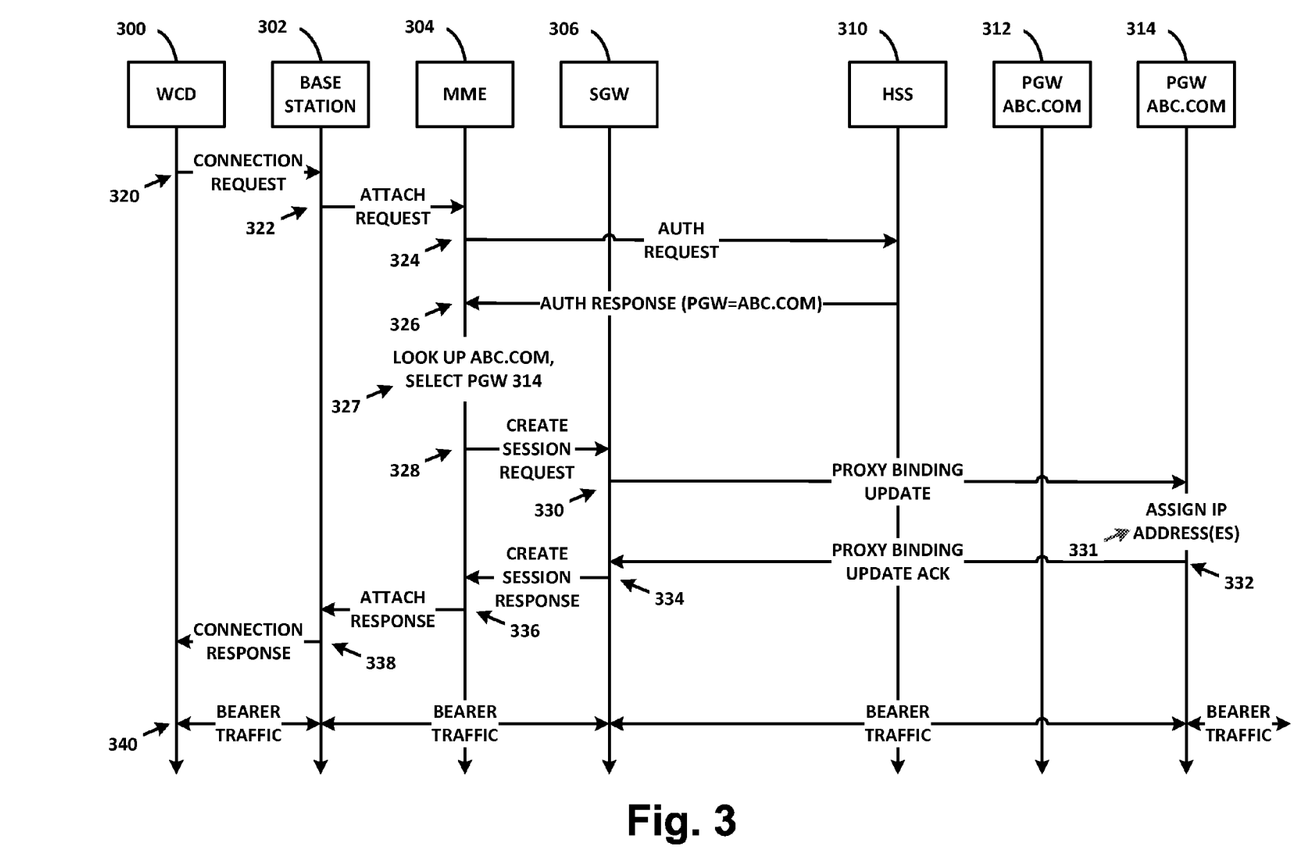
FIG. 3 is a message flow diagram, in accordance with example embodiments.
Figure 4:
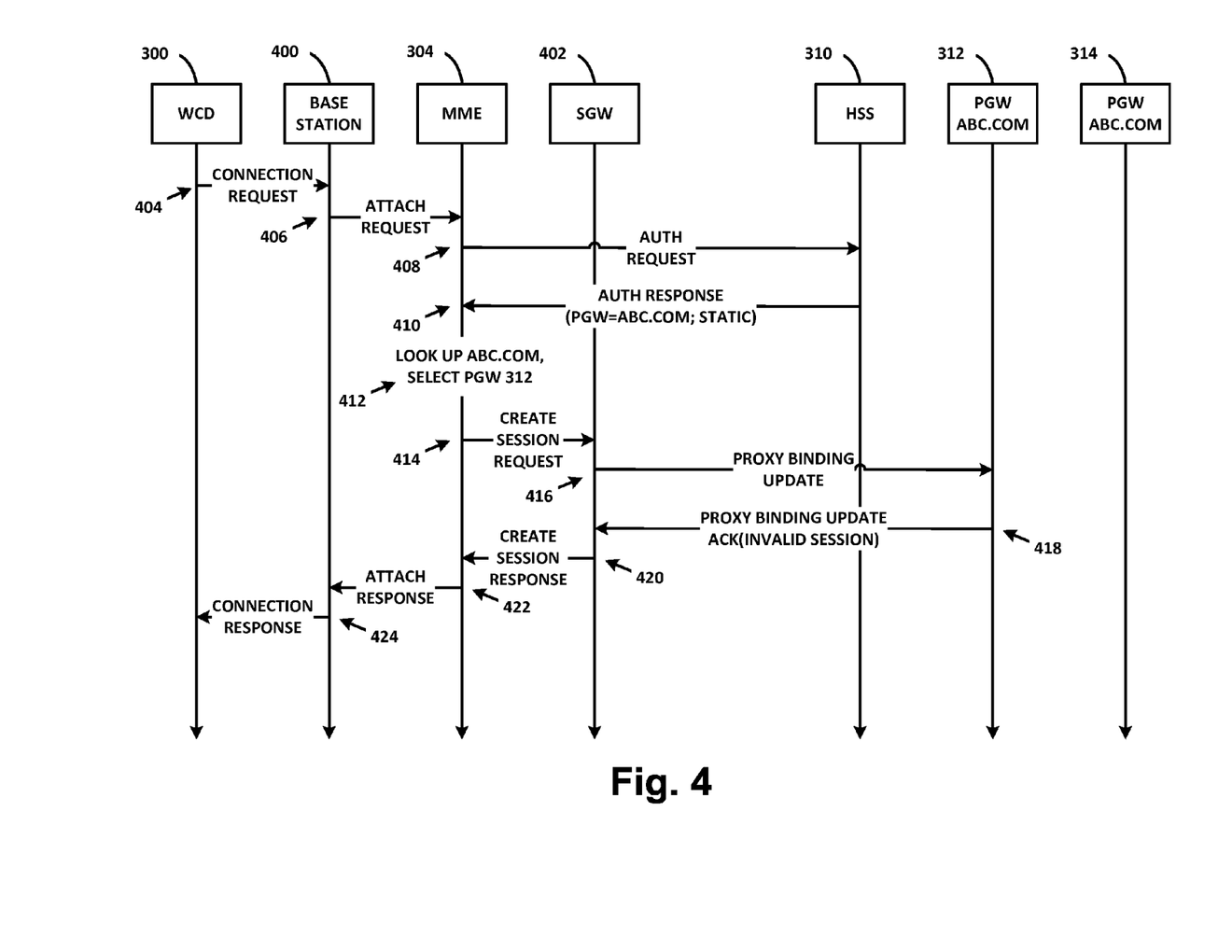
FIG. 4 is a message flow diagram, in accordance with example embodiments.
Figure 5:
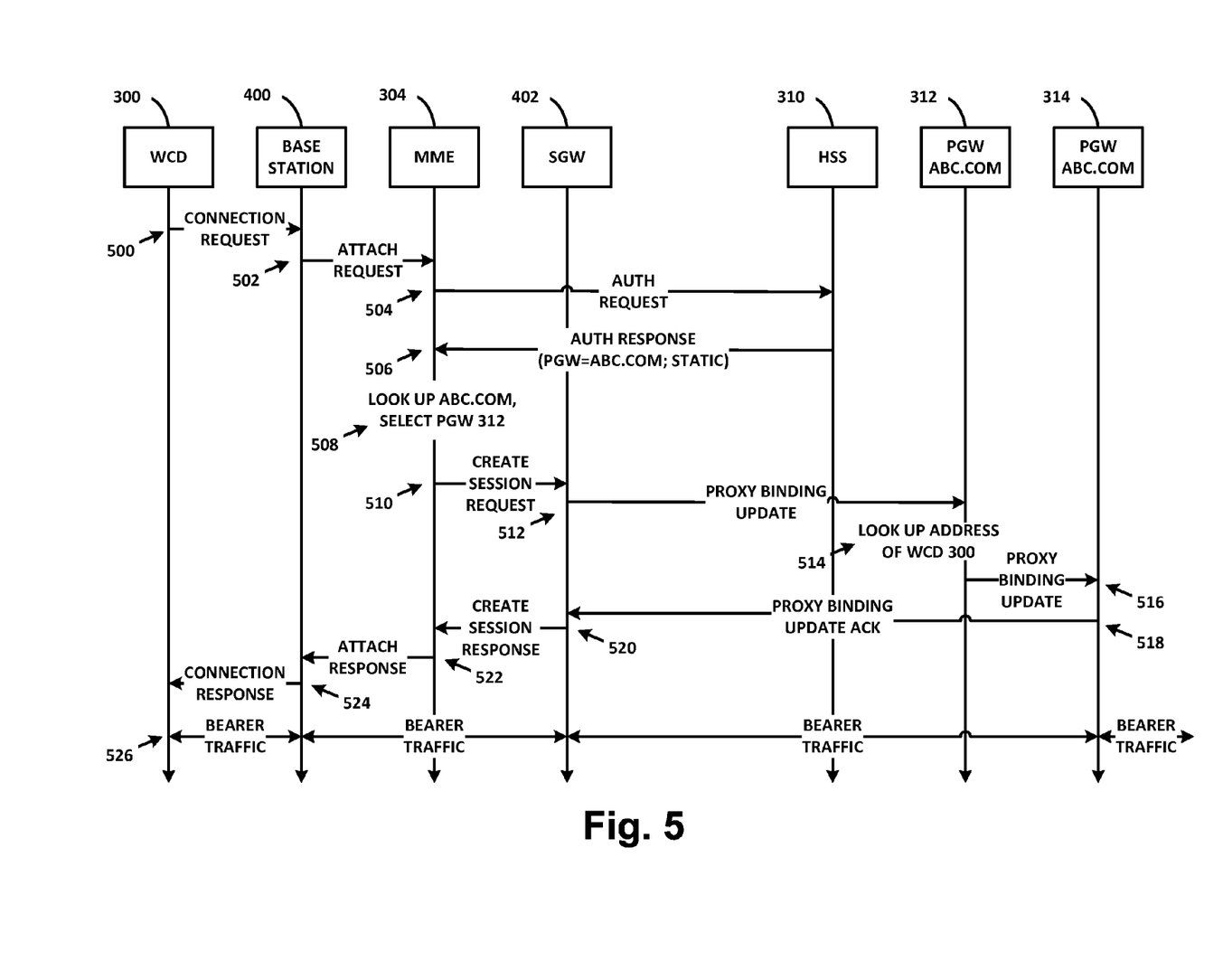
FIG. 5 is a message flow diagram, in accordance with example embodiments.

For purposes of illustration, this section describes examples of transactions in accordance with possible embodiments. FIGS. 3, 4, and 5 may involve, directly or indirectly, WCD 300, base station 302, base station 400, MME device 304, SGW device 306, SGW device 402, HSS device 310, PGW device 312, and/or PGW device 314. In some embodiments, base station 302, base station 400, MME device 304, SGW device 306, and SGW device 402 are operated by a roaming wireless service provider, while HSS device 310, PGW device 312, and PGW device 314 are operated by a home service provider. WCD 300 may be subscribed to the home service provider. The roaming wireless service provider equipment and the home wireless service provider equipment may be in different countries, regions, or continents. However, other embodiments may be possible.

Additionally, throughout FIGS. 3, 4, and 5, various messages may be referred to with various labels, such as "connection request, "attach request," "authentication request," and so on. In some implementations, messages that perform the substantive operations described herein may be given different labels, or may be referred to differently. Further, the operations of some messages shown in these figures may be performed by more or fewer messages. Moreover, for purposes of simplicity, these figures may omit some messages that may be present in particular embodiments.

FIG. 3 illustrates one possible way in which WCD 300 can obtain wireless service from the roaming wireless service provider and the home wireless service provider. In FIG. 3, it is assumed that WCD 300 has not yet been assigned an IP address by a home PGW device. For instance, WCD 300, or its wireless interface, may have recently been powered on.

At step 320, WCD 300 may transmit a connection request to base station 302. At step 322, base station 302, in turn, may transmit an attach request to MME device 304. MME device 304 may determine that WCD 300 is subscribed to the home service provider. In doing so, MME device 304 may examine an identifier of WCD 300, such as a network access identifier (NAI), international mobile subscriber identifier (IMSI), mobile equipment identifier (MEID), or some other type of device or user identifier. Based on this identifier, MME device 304 may determine that WCD 300 subscribes to the home wireless service provider, and that MME device 304 should request authentication of WCD 300 from HSS device 310.

At step 324, MME device 304 may transmit an authentication request to HSS device 310. This authentication request may seek to determine whether WCD 300 has a valid subscription with the home wireless service provider, and/or whether the home wireless service provider will permit WCD 300 to use the services of the roaming wireless service provider. HSS device 310 may look up the NAI, IMSI, MEID, or other identifier of WCD 300 in a local or remote subscriber database to make this determination. At step 326, if WCD 300 has a valid subscription and is permitted to use the services of the roaming wireless service provider, HSS device 310 may transmit an authentication response to MME device 304.

The authentication response may include an indication of the IP address(es) assigned to WCD 300. In this case, since WCD 300 has not yet been assigned an IP address, the indication may either be omitted from the authentication response, or may take on a default value (e.g., all zeroes) that represents a lack of IP address assignment.

The authentication response may also indicate that the roaming wireless service provider should assign WCD 300 to one a particular group of one or more home PGW devices. This group may be associated with or referred to by a domain name, such as abc.com, or some other identifier. In choosing the domain name to include in the authentication response, the HSS device may determine whether the domain name should be statically or dynamically assigned.

In the case of a static assignment, HSS device 310 may select a domain name that is associated with or assigned to WCD 300. As an example, the home wireless service provider of WCD 300 may operate a limited number of home PGW devices, and the selected static domain name may be associated with these home PGW devices. In the case of a dynamic assignment, HSS device 310 may select, for example, a domain name that is associated with one or more home PGW devices that are topologically or geographically close to WCD 300.

At step 327, after receiving the authentication response, MME device 304 may look up abc.com to determine an IP address of a home PGW device to assign to WCD 300. For instance, MME device 304 may perform a Domain Name System (DNS) transaction with a DNS server (not shown). In this transaction, MME device 304 may request an IP address mapped to the domain name abc.com. In some cases, the DNS server may contain or have access to several such mappings. For example, in FIG. 3, both home PGW device 312 and home PGW device 314 are associated with abc.com. The DNS server may select one or more of the mapped IP addresses associated with these home PGW devices, and provide it to MME device 304. If more than one mapped IP address is provided, MME device 304 may select one of the mapped IP addresses.

Regardless of whether the IP address selection is performed by a DNS server or MME device, the selection may be made on the basis of load balancing. For example, the selecting device may choose an IP address based on a round-robin or random procedure. Alternatively, the selecting device may choose an IP address based on some indication of load at the associated home PGW device.

In any case, MME device 304 obtains an IP address of a particular home PGW device. In the example illustrated in FIG. 3, this is home PGW device 314. Then, at step 328, MME device 304 may transmit a create session request to SGW device 306. Possibly among other functions, the create session request may instruct SGW device 306 to create a portion of a bearer path from itself to PGW device 314. Accordingly, at step 330, SGW device 306 may transmit a proxy binding update message to PGW device 314, and PGW device 314 may respond, at step 332, by transmitting a proxy binding update acknowledgement message to SGW device 306.

The proxy binding update and proxy binding update acknowledgment messages may be formed according to the mobile IPv6 protocol. Thus, these messages may be used to establish a bearer path between WCD 300, base station 302, SGW device 306, and home PGW device 314. At step 331, these messages also may facilitate assignment, by home PGW device 314, of one or more IP addresses to WCD 300. The allocated IP addresses may be IPv4 addresses, IPv6 addresses, or both. For instance, the proxy binding update acknowledgment message may include a representation of the assigned IP address(es).

Additional portions of the bearer path may be established at steps 334, 336, and 338. Thus, SGW device 306 may transmit a create session response to MME device 304, MME device 304 may transmit an attach response to base station 302, and base station 302 may transmit a connection response to WCD 300, as part of these respective steps.

At step 340, a bearer path has been established for WCD 300, possibly involving WCD 300, base station 302, SGW device 306, and PGW device 314. MME device 304 and HSS device 310 might perform only signaling functions, and therefore might not be part of this bearer path.

The bearer path may support a bearer association between WCD 300 and home PGW device 314. Via the bearer association, WCD 300 may use its assigned IP address(es) to exchange bearer traffic with correspondent nodes on a private network, a public network (e.g., the Internet), or with other devices and/or services within the home wireless service provider's network. This exchange of bearer traffic may involve one or more communication sessions between the WCD and one or more correspondent nodes.

In some embodiments, the WCD's bearer traffic may traverse both the SGW device and the home PGW device on its way to and from other devices and networks (e.g., web servers, gaming servers, email servers, etc.). Particularly, the WCD's bearer traffic may be tunneled between the SGW device and the home PGW device. The binding update message/binding update acknowledgment message transaction between the SGW device and the home PGW device may serve to establish the tunnel and further transactions of a similar nature may refresh the tunnel from time to time.

A tunnel occurs when a particular network protocol encapsulates a payload protocol, and can be used to hide the topological details of a network from the encapsulated protocols and their applications. In the case of FIG. 3, a tunnel between SGW device 306 and home PGW device 314 may carry the communication sessions of WCD 300 as the payload protocol.

As noted previously, in some situations, a WCD may be handed over to a different EPC network or a non-EPC network. This new access network may be operated by the WCD's home wireless service provider or another wireless service provider. In order to maintain the WCD's communication sessions throughout such handover processes, the WCD may be assigned to the same home PGW device. In this way, the home PGW device can continue serving the WCD's communication sessions in a manner that is transparent (or virtually transparent) to correspondent nodes.

Particularly, maintaining the same home PGW device allows a WCD to maintain the same assigned IP address(es). In IP networking, IP addresses (along with other information, such as Transmission Control Protocol (TCP) and/or User Datagram Protocol (UDP) port numbers) may be used by applications when communicating. Each of a WCD's communication sessions may be identified by a unique combination of IP addresses and port numbers used by the endpoints of that communication session.

For example, consider the situation where a WCD is assigned IP address 168.192.0.100, and is communicating with a correspondent node (e.g., a web server) that is assigned IP address 10.172.15.7. Further, in this communication session, the WCD may be using TCP port 1025 and the correspondent node may be using TCP port 80. This 4-tuple of IP addresses and ports may serve to identify a communication session.

As long as the values in the 4-tuple remain the same (and assuming network connectivity is maintained between the WCD and the correspondent node), the communication session can be used. If any of these four pieces of information changes, the communication session may fail. For instance, if the WCD is handed over to a new RAN and is ultimately assigned a different IP address, any ongoing TCP or UDP sessions using the WCD's old IP address become invalid, and may have to be restarted using the new IP address. In the case of multimedia sessions, such as a VoIP call or streaming video, any such a restart may result in a noticeable "break" in the session, or even a complete failure of the session. Other types of communication sessions may suffer a similar fate.

Therefore, it is desirable for a WCD's IP address(es) to not change during the lifetime of the WCD's communication sessions. WCD IP addresses may be allocated by home PGW device itself, or by a home PGW device that coordinates the assignment of IP addresses with separate resource allocation servers (an example of which may be an AAA device or an HSS device). For instance, one or more pools of contiguous IP addresses may be allocated to each home PGW device, such that each IP address in such pools is allocated to a unique home PGW device. A particular home PGW device may assign IP addresses from its pool(s) to WCDs that communicate via the particular home PGW device.

Consequently, when a WCD is handed over to a new SGW device, it is beneficial for the new SGW device to establish a bearer association with the home PGW device from which the WCD's IP address(es) have been allocated, instead of with some other PGW device. In this way, the home PGW device that assigned the WCD's IP address(es) can help maintain the WCD's communication sessions.

However, as noted previously, when an SGW device prepares to initiate a bearer association with a home PGW device, the home PGW device may be selected from a group of available home PGW devices. If the previously-selected home PGW device is not selected again, a bearer association may be established with a new home PGW device. Since this new home PGW device will have been allocated different IP address pools than the previously-selected home PGW device, the new home PGW device will be unable to support the WCD communicating via the its assign IP address(es). As a result, the WCD's communication sessions with the new home PGW device may fail.

FIG. 4 illustrates this possibility. In particular, FIG. 4 continues the example of FIG. 3, but assumes that WCD 300 has been handed over to base station 400 at some point after step 340. Base station 400 communicates via SGW device 402.

Thus, at step 404, WCD 300 may transmit a connection request to base station 400. At step 406, base station 400, in turn, may transmit an attach request to MME device 304. Similarly to the process described in FIG. 3, MME device 304 may determine that WCD 300 is subscribed to the home service provider.

At step 408, MME device 304 may transmit an authentication request to HSS device 310. At step 410, HSS device 310 may transmit an authentication response to MME 304. As was the case in FIG. 3, the authentication response may indicate that the roaming wireless service provider should assign WCD 300 to one a particular group of one or more home PGW devices associated with the domain name abc-.com. The authentication response may also include a representation of the IP address(es) assigned to WCD 300 by home PGW device 314.

At step 412, after receiving the authentication response, MME device 304 may look up abc.com to determine an IP address of a home PGW device to assign to WCD 300. Again, MME device 304 may perform a DNS transaction with a DNS server to map abc.com to a home PGW device IP address. In this transaction, however, MME device 304 winds up with the IP address of home PGW device 312, rather than the IP address of home PGW device 314. Recall that load balancing may be used to select the home PGW device IP address. Thus, there is no guarantee that the same home PGW device is selected after WCD 300 has been handed over to a new SGW device.

At step 414, MME device 304 may transmit a create session request to SGW device 402. The create session request message may include a representation of the IP address(es) assigned to WCD 300 by home PGW device 314. At step 416, SGW device 402 may transmit a proxy binding update message to home PGW device 312. The proxy binding update message may also include a representation of the IP address(es) assigned to WCD 300 by home PGW device 314.

In contrast to the example of FIG. 3, at step 418, home PGW device 312 responds by transmitting a proxy binding update acknowledgement message that indicates an invalid session. Since home PGW device 312 does not support these IP address(es), home PGW device 312 may reject the request of step 416.

As an example, suppose that WCD 300 was allocated IPv4 address 192.168.227.14 by home PGW device 314. Suppose further than home PGW device 312 only supports the IP address pools of 192.168.20.0-192.168.21.255 and 192.168.223.0-192.168.223.127. In this case, PGW device 312 can determine that 192.168.227.14 falls outside of the ranges of IP addresses in its pools, and therefore communication with WCD 300 using 192.168.227.14 cannot be supported.

Steps 420, 422, and 424 involve SGW device 402 transmitting a create session response to MME device 304, MME device 304 transmitting an attach response to base station 400, and base station 400 transmitting a connection response to WCD 300. These three steps may serve to inform WCD 300 that its bearer association with home PGW device 312 has failed.

At this point, WCD 300 may indicate to its user that the session has failed. Alternatively, home PGW device 312 may assign one or more new IP addresses to WCD 300, and a bearer path involving WCD 300, base station 400, SGW device 402, and home PGW device 312 may be established. Nonetheless, for reasons noted above, the existing communication sessions of WCD 300 may fail, and WCD 300 may have to establish new communication sessions with any correspondent nodes.

As an alternative to the message flow illustrated by FIG. 4, the message flow illustrated by FIG. 5 provides a way for WCD 300 to maintain its bearer association with home PGW device 314, as well as maintain its assigned IP address(es). Like FIG. 4, FIG. 5 continues the example of FIG. 3, assuming that WCD 300 has been handed over to base station 400 at some point after step 340.

At step 500, WCD 300 may transmit a connection request to base station 400. At step 502, base station 400, in turn, may transmit an attach request to MME device 304. Similarly to the process described in FIG. 3, MME device 304 may determine that WCD 300 is subscribed to the home service provider.

At step 504, MME device 304 may transmit an authentication request to HSS device 310. At step 506, HSS device 310 may transmit an authentication response to MME device 304. As was the case in FIGS. 3 and 4, the authentication response may indicate that the roaming wireless service provider should assign WCD 300 to one a particular group of one or more home PGW devices associated with the domain name abc.com. The authentication response may also include a representation of the IP address(es) assigned to WCD 300 by home PGW device 314.

At step 508, after receiving the authentication response, MME device 304 may look up abc.com to determine an IP address of a home PGW device to assign to WCD 300. Thus, MME device 304 may perform a DNS transaction with a DNS server to map abc.com to a home PGW device IP address. In this transaction, MME device 304 winds up with the IP address of home PGW device 312, rather than the IP address of home PGW device 314.

At step 510, MME device 304 may transmit a create session request to SGW device 402. The create session request message may include a representation of the IP address(es) assigned to WCD 300 by home PGW device 314. At step 512, SGW device 402 may transmit a proxy binding update message to home PGW device 312. The proxy binding update message may also include a representation of the IP address(es) assigned to WCD 300 by home PGW device 314.

In contrast to the scenario illustrated in FIG. 4, home PGW device 312 determines that the proxy binding update should instead be sent to home PGW device 314 so that WCD 300 can maintain its bearer association with that PGW device.

Particularly, home PGW device 312 (as well as the other home PGW devices associated with abc.com) may have access to a database that maps IP address pools to home PGW devices. A copy of this database may be stored on each home PGW device associated with abc.com, or may be centrally stored (e.g., in an AAA device, HSS device, or a similar device). Thus, at step 514, home PGW device 312 may look up the assigned IP address(es) of WCD 300 (provided to home PGW device 312 at step 512), and determine that these IP address(es) do not fall within the pools of home PGW device 312, but do fall within the pools of home PGW device 314.

Possibly in response to this determination, at step 516, home PGW device 312 may forward the proxy binding update to home PGW device 314. Home PGW device 314 may respond in turn, at step 332, by transmitting a proxy binding update acknowledgement message to SGW device 402. The proxy binding update acknowledgement message may additionally include an indication to SGW device 402 that home PGW device 314 is serving WCD 300, and that future proxy binding update messages related to WCD 300 should be sent directly to home PGW device 314.

In response, SGW device 402 may associate PGW device 314 with WCD 300. Further, at steps 522, 524, and 526, SGW device 402 may transmit a create session response to MME device 304, MME device 304 may transmit an attach response to base station 400, and base station 400 may transmit a connection response to WCD 300, respectively.

Therefore, at step 526, a bearer path has been established for WCD 300, possibly involving WCD 300, base station 400, SGW device 402, and PGW device 314. Via the communication sessions supported by the bearer association between WCD 300 and home PGW device 314, WCD 300 may use its assigned IP addresses to exchange bearer traffic with correspondent nodes on a private network, a public network (e.g., the Internet), or with other devices and/or services within the home wireless service provider's network. In this way, WCD 300 has been handed off between SGW device 306 and SGW device 402, but its bearer association, and the communication sessions supported thereby, remain anchored at home PGW device 314.

4. EXAMPLE OPERATIONS

Figure 6:
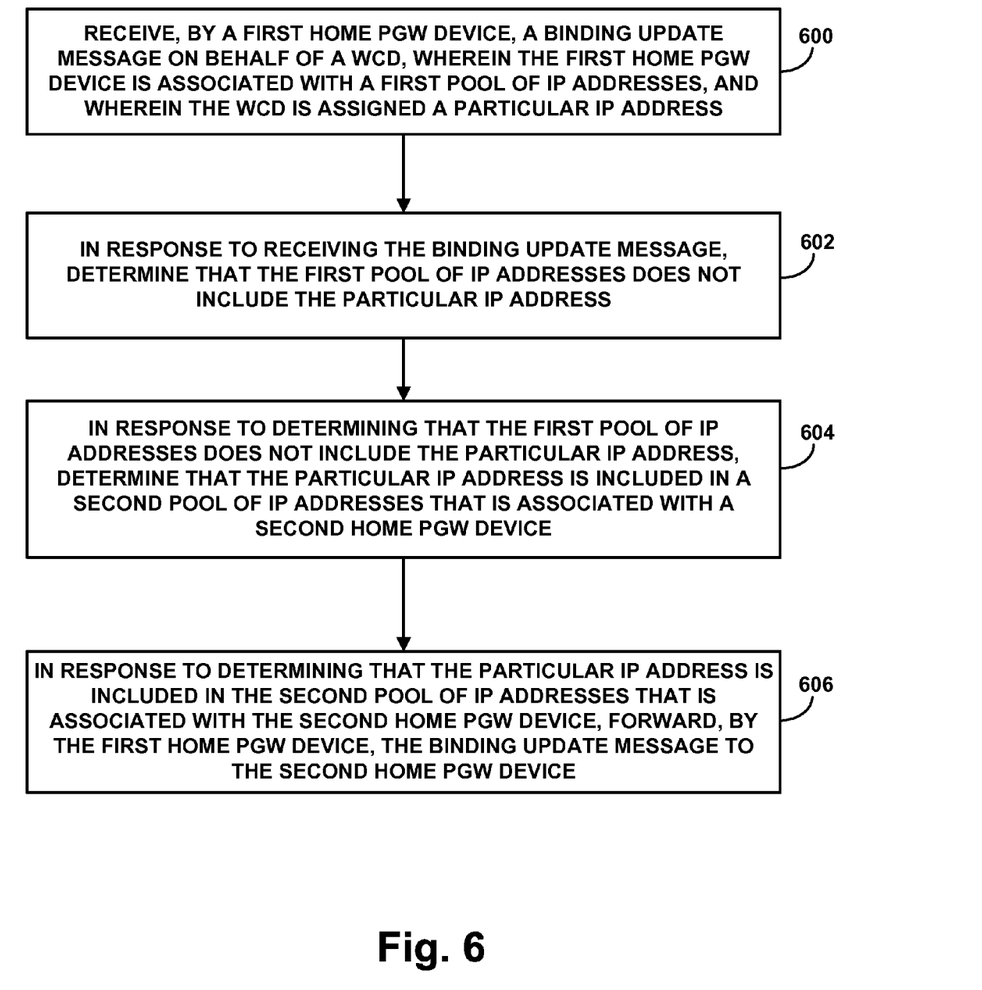
FIG. 6 is a flow chart, in accordance with example embodiments.

FIG. 6 is a flow chart in accordance with example embodiments. The operations illustrated by this flow chart may be carried out by a computing device, such as computing device 200. In some embodiments, computing device 200 may represent a home PGW device.

At block 600 of FIG. 6, a first home packet gateway PGW device may receive a binding update message on behalf of a WCD. The first home PGW device may be associated with a first pool of IP addresses, and the WCD may be assigned a particular IP address.

At block 602, possibly in response to receiving the binding update message, it may be determined that the first pool of IP addresses does not include the particular IP address. At block 604, possibly in response to determining that the first pool of IP addresses does not include the particular IP address, it may further be determined that the particular IP address is included in a second pool of IP addresses that is associated with a second home PGW device.

At block 606, possibly in response to determining that the particular IP address is included in the second pool of IP addresses that is associated with the second home PGW device, the first home PGW device may forward the binding update message to the second home PGW device.

The binding update message may indicate that the WCD has recently moved from being served by a first SGW device to being served by a second SGW device. Forwarding the binding update message to the second home PGW device may also be in response to the WCD having recently moved from being served by the first SGW device to being served by the second SGW device. The first SGW device and the second SGW device may be operated by different wireless service providers. Alternatively or additionally, the first SGW device and the second SGW device may serve WCDs using different air interfaces, such as "4G" LTE, "3G" CDMA, Wifi, etc.

The second home PGW device may receive the binding update message. Possibly in response to receiving the binding update message, the second home PGW device may transmit a binding update response message to the second SGW device. In these cases, the binding update response message may include an indication that the binding update message was forwarded to the second home PGW device from another home PGW device. Further, the binding update message may be a mobile IPv4 registration request message or IPv6 proxy binding update message, and the binding update response message may be a mobile IPv4 registration response message or a mobile IPv6 proxy binding update acknowledgement message.

The first home PGW device may maintain a table mapping pools of IP addresses to home PGW devices. Determining that the particular IP address is included in the second pool of IP addresses may involve looking up the particular IP address in the table and determining that the particular IP address is within the second pool of IP addresses.

Alternatively, the first home PGW device may have access to a server device containing a mapping between pools of IP addresses and home PGW devices. Determining that the particular IP address is included in the second pool of IP addresses may involve (i) the first home PGW device transmitting a request to the server device, where the request includes the particular IP address, and (ii) the first home PGW device receiving a response from the server device, where the response is to the request and contains an IP address of the second home PGW device.

The embodiments depicted in FIG. 6 are merely examples, and other embodiments may be possible. For instance, any of the features associated with any of FIGS. 3, 4, and/or 5 may be combined with the embodiments of FIG. 6.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, by a first home packet gateway (PGW) device, a binding update message on behalf of a wireless communication device (WCD), wherein the first home PGW device is associated with a first pool of Internet Protocol (IP) addresses from which the first home PGW device assigns IP addresses to WCDs served by the first home PGW device, and wherein the WCD is assigned a particular IP address;
   in response to receiving the binding update message, determining that the first pool of IP addresses does not include the particular IP address;
   in response to determining that the first pool of IP addresses does not include the particular IP address, determining that the particular IP address is included in a second pool of IP addresses that is associated with a second home PGW device, wherein the second home PGW device assigns IP addresses from the second pool of IP addresses to WCDs served by the second home PGW device; and
   in response to determining that the particular IP address is included in the second pool of IP addresses that is associated with the second home PGW device, forwarding, by the first home PGW device, the binding update message to the second home PGW device.

2. The method of claim 1, wherein the binding update message indicates that the WCD has moved from being served by a first SGW device to being served by a second SGW device, and wherein forwarding the binding update message to the second home PGW device is also in response to the WCD having moved from being served by the first SGW device to being served by the second SGW device.

3. The method of claim 2, wherein the first SGW device and the second SGW device are operated by different wireless service providers.

4. The method of claim 2, wherein the first SGW device and the second SGW device serve WCDs using different air interfaces.

5. The method of claim 2, further comprising:
   receiving, by the second home PGW device, the binding update message; and
   in response to receiving the binding update message, transmitting, by the second home PGW device, a binding update response message to the second SGW device.

6. The method of claim 5, wherein the binding update response message includes an indication that the binding update message was forwarded to the second home PGW device from another home PGW device.

7. The method of claim 5, wherein the binding update message is a mobile IPv6 proxy binding update message and the binding update response message is a mobile IPv6 proxy binding update acknowledgement message.

8. The method of claim 1, wherein the first home PGW device maintains a table mapping pools of IP addresses to home PGW devices, and wherein determining that the particular IP address is included in the second pool of IP addresses comprises:
   looking up the particular IP address in the table and determining that the particular IP address is within the second pool of IP addresses.

9. The method of claim 1, wherein the first home PGW device has access to a server device containing a mapping between pools of IP addresses and home PGW devices, and wherein determining that the particular IP address is included in the second pool of IP addresses comprises:
   transmitting, by the first home PGW device, a request to the server device, wherein the request includes the particular IP address; and
   receiving, by the first home PGW device, a response from the server device, wherein the response is to the request and contains an IP address of the second home PGW device.

10. An article of manufacture including a non-transitory computer-readable medium, having stored thereon program instructions that, upon execution by a first home packet gateway (PGW) device, cause the first home PGW device to perform operations comprising:
    receiving a binding update message on behalf of a wireless communication device (WCD), wherein the first home PGW device is associated with a first pool of Internet Protocol (IP) addresses from which the first home PGW device assigns IP addresses to WCDs served by the first home PGW device, and wherein the WCD is assigned a particular IP address;
    in response to receiving the binding update message, determining that the first pool of IP addresses does not include the particular IP address;
    in response to determining that the first pool of IP addresses does not include the particular IP address, determining that the particular IP address is included in a second pool of IP addresses that is associated with a second home PGW device, wherein the second home PGW device assigns IP addresses from the second pool of IP addresses to WCDs served by the second home PGW device; and
    in response to determining that the particular IP address is included in the second pool of IP addresses that is associated with the second home PGW device, forwarding the binding update message to the second home PGW device.

11. The article of manufacture of claim 10, wherein the binding update message indicates that the WCD has moved from being served by a first SGW device to being served by a second SGW device, and wherein forwarding the binding update message to the second home PGW device is also in response to the WCD having moved from being served by the first SGW device to being served by the second SGW device.

12. The article of manufacture of claim 11, wherein the first SGW device and the second SGW device are operated by different wireless service providers.

13. The article of manufacture of claim 11, wherein forwarding the binding update message to the second home PGW device triggers the second home PGW device to (i) receive the binding update message, and (i) in response to receiving the binding update message, transmit a binding update response message to the second SGW device.

14. The article of manufacture of claim 13, wherein the binding update response message includes an indication that the binding update message was forwarded to the second home PGW device from another home PGW device.

15. The article of manufacture of claim 13, wherein the binding update message is a mobile IPv6 proxy binding update message and the binding update response message is a mobile IPv6 proxy binding update acknowledgement message.

16. A first home packet gateway (PGW) device comprising:
   at least one processor;
   memory; and
   program instructions, stored in the memory, that upon execution by the at least one processor cause the first home PGW device to perform operations comprising:
      receiving a binding update message on behalf of a wireless communication device (WCD), wherein the first home PGW device is associated with a first pool of Internet Protocol (IP) addresses from which the first home PGW device assigns IP addresses to WCDs served by the first home PGW device, and wherein the WCD is assigned a particular IP address;
      in response to receiving the binding update message, determining that the first pool of IP addresses does not include the particular IP address;
      in response to determining that the first pool of IP addresses does not include the particular IP address, determining that the particular IP address is included in a second pool of IP addresses that is associated with a second home PGW device, wherein the second home PGW device assigns IP addresses from the second pool of IP addresses to WCDs served by the second home PGW device; and
      in response to determining that the particular IP address is included in the second pool of IP addresses that is associated with the second home PGW device, forwarding the binding update message to the second home PGW device.

17. The first home PGW device of claim 16, wherein the binding update message indicates that the WCD has moved from being served by a first SGW device to being served by a second SGW device, and wherein forwarding the binding update message to the second home PGW device is also in response to the WCD having moved from being served by the first SGW device to being served by the second SGW device.

18. The first home PGW device of claim 17, wherein the first SGW device and the second SGW device are operated by different wireless service providers.

19. The first home PGW device of claim 17, wherein forwarding the binding update message to the second home PGW device triggers the second home PGW device to (i) receive the binding update message, and (i) in response to receiving the binding update message, transmit a binding update response message to the second SGW device.

20. The first home PGW device of claim 19, wherein the binding update response message includes an indication that the binding update message was forwarded to the second home PGW device from another home PGW device.

* * * * *